(12) United States Patent
Matsuoka

(10) Patent No.: US 8,248,679 B2
(45) Date of Patent: Aug. 21, 2012

(54) MULTIBEAM SCANNING DEVICE

(75) Inventor: Shohei Matsuoka, Tokyo (JP)

(73) Assignee: Prsym, Inc., San Jose, CA (US)

( * ) Notice: Subject to any disclaimer, the term of this patent is extended or adjusted under 35 U.S.C. 154(b) by 287 days.

(21) Appl. No.: 12/674,652

(22) PCT Filed: Aug. 19, 2008

(86) PCT No.: PCT/JP2008/064719
§ 371 (c)(1),
(2), (4) Date: Feb. 22, 2010

(87) PCT Pub. No.: WO2009/025261
PCT Pub. Date: Feb. 26, 2009

(65) Prior Publication Data
US 2010/0302610 A1    Dec. 2, 2010

(30) Foreign Application Priority Data

Aug. 21, 2007    (JP) .................................. 2007-214398

(51) Int. Cl.
*G02B 26/08* (2006.01)
(52) U.S. Cl. .................................................... 359/204.1
(58) Field of Classification Search ............... 359/201.1, 359/205.1, 212.1–214.1, 216.1
See application file for complete search history.

(56) References Cited

U.S. PATENT DOCUMENTS 7,450,274 B2    11/2008    Itabashi et al.
2004/0095625 A1*    5/2004    Yamawaki ................. 359/204.1

FOREIGN PATENT DOCUMENTS

| JP | 2002-174785 | 6/2002 |
|---|---|---|
| JP | 2004-333862 | 11/2004 |
| JP | 2005-037502 | 2/2005 |
| JP | 2005-055793 | 3/2005 |
| JP | 2005-127852 | 5/2005 |
| JP | 2007-133320 | 5/2007 |

OTHER PUBLICATIONS

International Preliminary Report on Patentability issued Mar. 4, 2010 in International Application No. PCT/JP2008/064719 (English Translation dated Mar. 18, 2010), 10 pages.

(Continued)

*Primary Examiner* — Euncha Cherry
(74) *Attorney, Agent, or Firm* — Patterson & Sheridan, LLP

(57) ABSTRACT

A multibeam scanning device, comprising: a plurality of first optical systems, each of the plurality of optical systems including a light source unit configured to emit a non-collimated light beam, and an optical element having a predetermined power and having an optical effect on the laser beam; a second optical system arranged on a downstream side of the plurality of first optical systems, including a first deflector on which light beams emitted by the plurality of first optical systems are incident, the first deflector being to deflect the laser beams, and a common optical system configured to change degree of divergence of each of the plurality of light beams; and an optical path shifting system configured to translate an incident optical path of the light beam which is emitted by the light source and incident on the optical element, wherein all the light beams incident on the first deflector are incident on the first deflector at substantially the same position, and wherein the optical elements are arranged such that optical axes of the optical elements intersect at a position spaced from the optical element by a distance equal to a focal length of the optical element.

21 Claims, 9 Drawing Sheets

OTHER PUBLICATIONS

International Preliminary Report on Patentability dated Mar. 9, 2010, for PCT Application No. PCT/JP2008/064719 filed Aug. 19, 2008, four pages (English translation, four pages).

International Search Report mailed Oct. 7, 2008, for PCT Application No. PCT/JP2008/064719 filed Aug. 19, 2008, two pages (English translation, two pages).

* cited by examiner (A)

(B)

MULTIBEAM SCANNING DEVICE

TECHNICAL FIELD

The present invention relates to a multibeam scanning device which may be employed in an image forming device such as a laser beam printer, a projector and the like.

BACKGROUND OF THE INVENTION

Recently, the image forming device such as the laser beam printer or the projector often employs the multibeam scanning device which is provided with a plurality of light sources arranged in a predetermined direction. In the image forming device employing the multibeam scanning device, the laser beams emitted by the plurality of light source are ON/OFF modulated in accordance with a modulation signal generated in accordance with image formation data, and the modulated laser beams are deflected by a deflector to scan on a surface to be scanned so that the laser beams scan thereon in a first direction. At the same time, by moving the incident position of the laser beam (i.e., a spot of formed by the laser beam incident thereon) on the surface to be scanned in a second direction, which is perpendicular to the scanning direction (first direction), copying or imaging of a two-dimensional image can be performed.

In the following description, the first direction is referred to as a main scanning direction, and the second direction is referred to as an auxiliary scanning direction. Further, when optical paths of the multibeam scanning device are developed, a plane including a central axis of a scanning optical system (i.e., an optical axis of the scanning optical system) and the main scanning direction will be referred to as a main scanning plane, and a plane including the central axis of the scanning optical system and the auxiliary scanning direction will be referred to as an auxiliary scanning plane.

Among the multibeam scanning devices described above, there are ones provided with an adjusting mechanism for adjusting the positions of the beam spots such that the beam spots formed on the surface to be scanned are spaced evenly, as disclosed, for example, in Japanese Patent Provisional Publication No. 2004-333862A.

In the above described publication, on a downstream side of each light source, a wedge prism which is rotatable about an axis parallel to an optical path of the laser beam is provided. By rotating the wedge prism, a condition where the light source is hypothetically displaced from an actual position, i.e., a condition where a virtual image of the light source is displaced, is created. With this configuration, the designer tries to change the position of each beam spot on the surface to be scanned by changing an incident angle of each laser beam with respect to the deflector (i.e., a deflecting surface).

With the configuration disclosed in the above described publication, however, the positions where the laser beams are incident on the deflector are changed. Such a change may cause vignetting and/or deterioration of performance in deflection. According to the above described publication, only a one-dimensional scanning is considered in the main scanning direction, and on the auxiliary scanning plane, the beams are converged on the deflection surface. Therefore, the above described publication does not deal with the above problem.

When both the main scanning and auxiliary scanning are to be performed in the image forming device on which the multibeam scanning optical system is mounted, if the laser beams emitted by the respective light sources are converged on the deflection surface, the deflection surface and the surface to be scanned become conjugate with each other. In such a case, regardless of the incident angle of the laser beam, an image height of the laser beam on the surface to be scanned remains constant. Such an optical system does not work as a scanning system. Therefore, in devices requiring that the beams should not be converged on the deflection surface, a change of the incident angle with respect to the deflection surface causes a change of the incident position thereon relatively largely in comparison with a device such as the above described publication which is configured that the beams are converged on the deflection surface on the auxiliary scanning plane. Therefore, in devices in which the beams cannot be converged on the deflection surface, effects of shift of the incident positions of the laser beams on the deflection surface cannot be overlooked, different from the disclosure of the above described publication.

Thus, in the devices which do not converge light beams on the deflection surface (e.g., a multibeam scanning device), if the positions of the beam spots are to be adjusted employing the configuration of the above described publication, the displacement of the incident positions of the beam spots as described above should be prevented effectively. Specifically, an adjusting mechanism that moves the light source to adjust the incident positions may be required, or the size of a large deflector, which can deal with a relatively large shift of the incident positions, should be increased.

DISCLOSURE OF THE INVENTION

Therefore, in view of the above problem, the object of the present invention is to provide an improved multibeam scanning device in which collimated beams, converging beams or diverging beams are incident on a deflection surface (i.e., beams are not converged on the deflection surface) and which is configured to be able to stably adjust spot positions on a surface to be scanned while attaining a simple configuration and a compact size.

In view of the foregoing, there is provided a multibeam scanning device, comprising: a plurality of first optical systems, each of the plurality of optical systems including a light source unit configured to emit a non-collimated light beam and an optical element having a predetermined power and having an optical effect on the laser beam; a second optical system arranged on a downstream side of the plurality of first optical systems, including a first deflector on which light beams emitted by the plurality of first optical systems are incident, the first deflector being to deflect the laser beams, and a common optical system configured to change degree of divergence of each of the plurality of light beams; and an optical path shifting system configured to translate an incident optical path of the light beam which is emitted by the light source and incident on the optical element in a direction perpendicular to an optical axis of the optical element in a plane perpendicular to a direction in which a deflector closest to a surface to be scanned deflects the light beam, wherein all the light beams incident on the first deflector are incident on the first deflector at substantially the same position, and wherein the optical elements are arranged such that optical axes of the optical elements intersect at a position spaced from the optical element by a distance equal to a focal length of the optical element.

According to the multibeam scanning device of the present invention, by only shifting the incident optical path of the laser beam emitted from each light source and incident on the optical element, it becomes possible to change the incident angle with respect to the deflection surface without changing the incident position of each laser beam with respect to the deflection surface. Consequently, it becomes possible to stable adjust the position of the spot formed when each laser beam is incident on the surface to be scanned. Further, since the plurality of collimated beams are incident on the first deflector substantially at the same position, it is possible to achieve decreasing of the thickness of the first deflector.

According to a multibeam scanning device of the present invention, the light source unit includes a light emitting unit configured to emit the light beam, and a coupling lens group configured to reduce the degree of divergence of the light beam emitted by the light emitting unit, and a magnification M of the coupling lens group meets a condition:

$$|1/M|>0.0006.$$

According to a multibeam scanning device of the present invention, the optical element is, for example, a collimating lens that converts the light beam emitted by the light source unit to a collimated light beam.

According to a multibeam scanning device of the present invention, at least a part of the common optical system may be arranged on an upstream side of the first deflector. In this case, an exit pupil of the at least a part of the common optical system is positioned at a deflection surface of the first deflector.

According to a multibeam scanning device of the present invention, the at least a part of the common optical system is, for example, an angular magnification alteration optical system.

According to a multibeam scanning device of the present invention, the optical element is provided with a part of the magnifying power of the common optical system.

According to a multibeam scanning device of the present invention, when all the common optical system are arranged on the downstream side of the first deflector, it is preferable that the entrance pupil of the common optical system coincides with the deflection surface of the first deflector.

According to a multibeam scanning device of the present invention, the optical path shifting system may shift the light source unit in the predetermined direction to translate the incident optical path.

According to a multibeam scanning device of the present invention, the optical path shifting system includes an optical path adjusting optical element having no power provided between the light source unit and the optical element, and the optical path shifting system may translate the incident optical path by displacing the optical path adjusting optical element.

According to a multibeam scanning device of the present invention, the optical path adjusting optical element has a plurality of reflection surfaces, and wherein the incident optical path may be translated by changing a relative position of each reflection surface.

According to a multibeam scanning device of the present invention, the optical path adjusting optical element is a prism having two reflection surfaces parallel to each other, and positions of the reflection surfaces may be changed by rotating the prism about a rotation axis which is an emitting optical axis of the light source unit.

According to a multibeam scanning device of the present invention, the optical path adjusting optical element is a parallel plate, and the incident optical path may be translated by rotating the parallel plate about an axis which is perpendicular to an emitting optical axis of the light source unit.

According to a multibeam scanning device of the present invention, it is preferable that a light receiving surface of the optical path adjusting optical element, on which the light beam emitted by the light source unit is incident is inclined normally with respect to the emitting optical axis of the light source unit.

According to a multibeam scanning device of the present invention, it is preferable that the common optical system further includes a scanning optical system which enables the light beams directed from the first deflector to scan on the surface to be scanned at a constant speed.

According to a multibeam scanning device of the present invention, the second optical system may include: a second deflector which is arranged between the first deflector and the scanning optical system and deflects the light beams incident on the second deflector in a direction perpendicular to a direction in which the first deflector the light beams; and a relaying optical system arranged between the first deflector and the second deflector, and wherein the surface to be scanned may be unmovable with respect to the scanning optical system.

A multibeam scanning device of the present invention may further include a chief ray emission angle adjusting system configured to adjust an emission angle at which the light beam is emitted from the light source unit in the plane perpendicular to a direction in which the deflector closest to the surface to be scanned deflects the light beam. In this configuration, the chief ray emission angle adjusting system may include: a coupling lens group provided in the light source unit; and a coupling lens shifting system configured to shift each coupling lens of the coupling lens group in a direction perpendicular to the optical axis of the light source unit in the plane perpendicular to a direction in which the deflector closest to the surface to be scanned deflects the light beam.

According to a multibeam scanning device of the present invention, the coupling lens group may include a first coupling lens and a second coupling lens having a smaller power than the first coupling lens. In this configuration, the coupling lens shifting system is configured to shift the second coupling lens, relative to the first coupling lens, in a direction perpendicular to the optical axis of the light source unit in the plane perpendicular to a direction in which the deflector closest to the surface to be scanned deflects the light beam.

It is preferable that when P1 represents a power of the first coupling lens and P2 represents a power of the second coupling lens, the multibeam scanning device meets a relationship:

$$P1>10\cdot|P2|.$$

Preferably, a diameter of the second coupling lens is larger than a diameter of the first coupling lens.

According to the invention, there is provided a multibeam scanning device, comprising: a plurality of light source units configured to emit laser beams which are non-collimated light beams; a plurality of collimating lenses arranged to collimate the plurality of laser beams, respectively, optical axes of the plurality of collimating lenses intersecting with each other at a predetermined position spaced from each of the plurality of collimating lenses by a distance equal to a focal length of each of the plurality of collimating lenses; a first deflector which deflects the plurality of collimated laser beams so that the plurality of laser beams scan on a surface to be scanned in an auxiliary scanning direction; a relaying lens system arranged on a downstream side of the first deflector, an entrance pupil of the relaying lens system coinciding with the predetermined position at which the optical axes of the plurality of collimating lenses intersect; a second deflector which deflects the plurality of laser beams incident via the relaying lens system from the first deflector so that the plurality of laser beams scan on the surface to be scanned in a main scanning direction; and a beam position adjusting system configured to change an optical path of a laser beam emitted by at least one of the plurality of light source units in a manner that a beam spot formed by the laser beam is translated in the auxiliary scanning direction on the surface to be scanned. Preferably, the predetermined position is on a deflection surface of the first deflector. The beam position adjusting system may include a translating mechanism configured to translate the at least one of the plurality of light source units in a direction perpendicular to the optical axis of the at least one of the plurality of light source units.

BRIEF DESCRIPTION OF THE ACCOMPANYING DRAWINGS

BEST MODE FOR CARRYING OUT THE INVENTION

Figure 1:
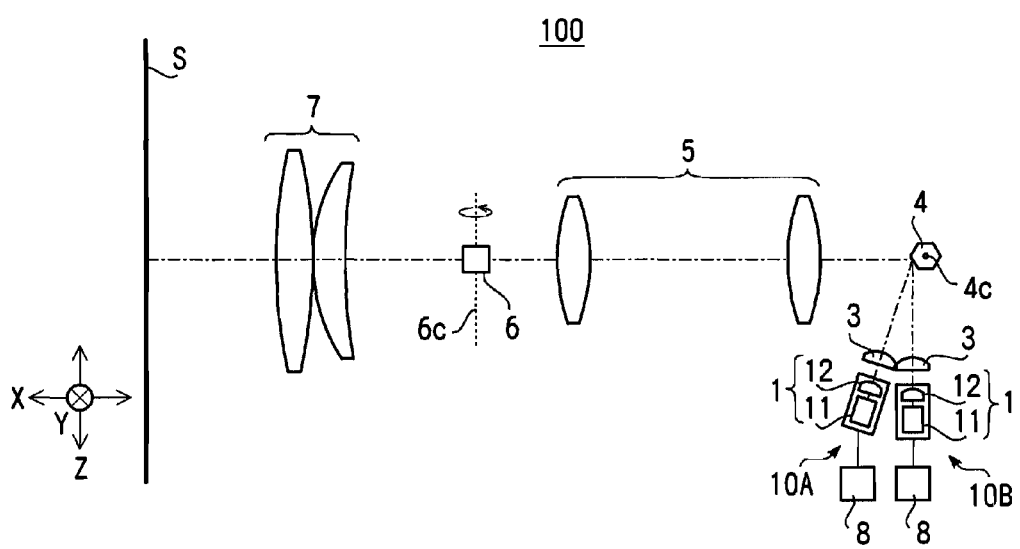
FIG. 1 is a cross sectional view, on an auxiliary scanning plane, schematically showing a configuration of a projector employing a multibeam scanning device according to a first embodiment of the invention.

FIG. 1 shows a projector, which is an example of a multibeam scanning device according to a first embodiment of the invention, on an auxiliary scanning cross sectional plane, generally illustrating a configuration thereof. The projector includes a multibeam scanning device 100 and a screen S. As shown in FIG. 1, the multibeam scanning device 100 includes a plurality of (two, in this example) first optical systems 10A and 10B, a first polygonal minor 4, a relaying lens system 5, a second polygonal minor 6 and a scanning lens system 7, in this order from the light source side. The plurality of first optical systems 10A and 10B have the same structure, and are arranged on the auxiliary scanning plane. Therefore, in the following description, the explanation focuses on only the first optical system 10A unless the necessity arises. Regarding the other first optical systems, only the reference numbers thereof will be referred to. The first optical system 10A includes a light source unit 1 which is provided with a light source 11 and a coupling lens 12, and a converging lens 3. The light source unit 1 is connected with an optical path adjusting unit 8 which is explained later. The converging lens 3 is arranged between the light source unit 1 and the first polygonal mirror 4.

In the following description, the main scanning direction is referred to as a Y-direction, the auxiliary scanning direction will be referred to as an Z-direction. Further, a direction perpendicular to Y-direction and Z-direction, i.e., a direction normal to the screen S which is a surface to be scanned is defined as an X-direction.

When the multibeam scanning device 100 is operated, scanning of the screen S is performed as follows. The laser beams emitted by the light sources 11 pass through the corresponding coupling lenses 12 and converging lenses 3, and are incident on the deflection surface of the first polygonal mirror 4 at substantially the same position.

The first polygonal mirror 4 is configured to be rotatable about its central axis 4c, which extends in the Y-direction. That is, the first polygonal mirror 4 serves as a deflector which makes the laser beams scan in the auxiliary scanning direction on the screen S.

The laser beams deflected by the deflection surface of the first polygonal mirror 4 pass through the relaying lens system 5 and are incident on the second polygonal mirror 6 at substantially the same position. The second polygonal mirror 6 is configured to be rotatable about its central axis 6c, which extends in the Z-direction. That is, the second polygonal mirror 6 serves as a deflector which makes the laser beams scan in the main scanning direction on the screen S.

The laser beams are continuously deflected at the angle corresponding to the rotational condition of the second polygonal mirror 6 and are incident on the scanning lens system 7. It should be noted that, according to the embodiment, the scanning lens system 7 consists of two lens elements as shown in FIG. 1 by way of example. However, the invention need not be limited to such a configuration. The laser beams emerged from the scanning lens system 7 scan on the screen S in the main scanning direction (i.e., the Y-direction).

The first polygonal mirror 4 is rotated by a predetermined amount per one scanning of the laser beams, in the Y-direction, by the second polygonal mirror 6. The predetermined amount is defined as an amount corresponding to a length obtained by multiplying the number of laser beams used for scanning on the screen S and a spot size (i.e., a diameter of a beam spot in the auxiliary scanning direction) together. By repeating such an operation, a two-dimensional image is formed on the screen S. That is, the screen S which is a surface to be scanned in the embodiment does not move with respect to the scanning lens system 7 in contrast to a photosensitive drum which is rotatably provided.

Figure 2:
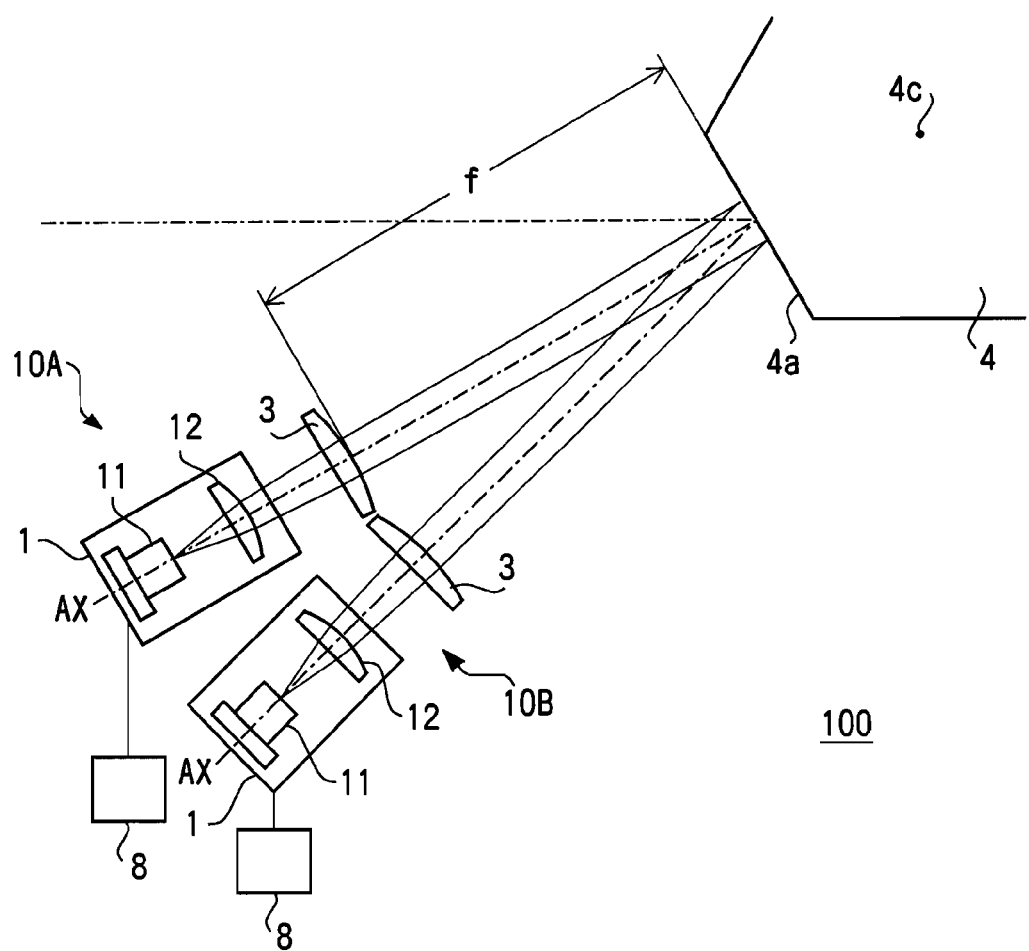
FIG. 2 is an enlarged view of the vicinity of first optical systems of the multibeam scanning device according to the first embodiment.

Hereinafter, a configuration for appropriately adjusting the intervals among the beam spots with suppressing variation of the incident position at which the laser beams are incident on the deflection surface is explained in detail. FIG. 2 is an auxiliary scanning plane cross section enlarging the vicinity of the first optical systems 10A and 10B of the multibeam scanning device 100 according to the first embodiment.

As shown in FIG. 2, each coupling lens 12 converts the laser beam, which is a diverging light beam, emitted by the light source 11 to a beam having a gentler diverging characteristic than the beam emitted by the light source 11. According to the embodiment, the beam emerged from the coupling lens 12 may have a converging characteristic in contrast to a diverging beam described above, but must not be a collimated light beam. That is, in the multibeam scanning device 100 according to the first embodiment, the laser beams emitted by the light source units 1 must be non-collimated light beams.

The converging lens 3 has a power corresponding to the diverging or converging characteristic of the laser beam which passes through the coupling lens and is incident thereon, and coverts the incident beam into the collimated light beam. According to the first embodiment, the converging lens 3 functions as a collimating lens. The converging lenses 3 are arranged such that the optical axes thereof intersect with each other at a position spaced from the converging lenses 3 by a distance equal to the focal length thereof. Further, an entrance pupil of a common optical system, which is defined as an optical system on which the laser beams emerged from the first optical systems 10A and 10B are incident, coincides with the intersecting position of the optical axes of the converging lenses 3. Specifically, according to the first embodiment, the common optical system consists of the relaying lens system 5 and the scanning lens system 7, and the position of the entrance pupil of the relaying lens system 5 coincides with the intersecting position of the optical axes of the converging lenses 3.

In the specification, for describing purpose, the optical systems on the downstream side of the first optical systems 10A and 10B will be referred to as a second optical system. Thus, the common optical system is can be defined as an optical system excluding the polygonal minors 4 and 6 from the second optical system. In the configuration shown in FIGS. 1 and 2, the second optical system corresponds to the optical systems on the downstream side of the first polygonal mirror 4.

Generally, in multibeam scanning devices, an entrance pupil of an optical system arranged on an immediate downstream side of the polygonal mirror coincides with a deflection surface of the polygonal mirror. According to the first embodiment, in order to locate the entrance pupil on the deflection surface of the first polygonal mirror 4, each converging lens 3 is arranged to be spaced from the deflection surface of the first polygonal mirror 4 by its focal length f. In addition, converging lenses 3 are arranged such that the laser beams emerged from the converging lenses 3 are incident on the deflection surface 4a of the polygonal mirror 4 at substantially the same position. In summary, the intersecting position of the optical axes of the converging lenses 3, the entrance pupil of the relaying lens system 5 and the deflection surface 4a of the first polygonal mirror 4 are at the same position.

As described above, the laser beams incident on the converging lenses 3 are non-collimated light beams. In order to ensure this condition, the magnification M of each coupling lens 12 is determined to meet the following condition.

$$|1/M|>0.0006$$

The above described condition will be explained in detail. If the light beams emerged from the coupling lenses 12 become collimated light beams as the lens holders/housing of the scanning device 100 are deformed due to change of environmental conditions (e.g., humidity/temperature), the laser beams emerged from the converging lenses 3 arranged as described above are converged, on the auxiliary scanning plane, on the deflection surface 4a of the first polygonal mirror 4. In such a case, similar to the tilt compensation generally employed in the LSU, the laser beams are not deflected in the auxiliary scanning direction. For this reason, the coupling lenses 12 may be configured such that the lens holders will not be affected by the environmental variation. Specifically, the coupling lens 12 may be configured not to be affected by a linear expansion of the lens holder. If the lens holder is formed of resin, a linear expansion coefficient is approximately $2\times10^{-5}$ per 1° C. Therefore, a variable amount $\Delta L$ of the distance between the light source 11 and the coupling lens 12 for a temperature variation of ±30° C. is calculated as follows.

$$\Delta L = L \times 2 \times 10^{-5} \times (\pm 30) \qquad (1),$$

where L represents a focal length of the coupling lens 12.

When the magnification of the coupling lens 12 is M (M<0 because of the diverging beam), a distance D between the light source 11 and (the principle point of) the coupling lens 12 is calculated as follows.

$$D = L + L/M \qquad (2)$$

If the sum of $\Delta L$ obtained from equation (1) and D obtained from equation (2) equals to L, the laser beam emerged from the coupling lens 12 becomes the collimated light beam. Therefore, in order to avoid such a condition, it is necessary that the following condition (3) is satisfied.

$$|L/M| > L \times 2 \times 10^{-5} \times (\pm 30) \qquad (3)$$

As described above, according to the multibeam scanning device 100, the laser beams emitted by the light sources 11 are made incident, as the collimated light beams, on substantially the same position (more specifically, the center position of the entrance pupil of the second optical system). With this configuration, the interval between the beam spots formed by the laser beams incident on the screen S only depends on the difference of the incident angles of the laser beams emerging from the first optical systems 10A and 10B with respect to the deflection surface 4a. Therefore, the positions of the beams spots on the screen S can be adjusted by simply changing the incident angles of the laser beams.

Figure 3:
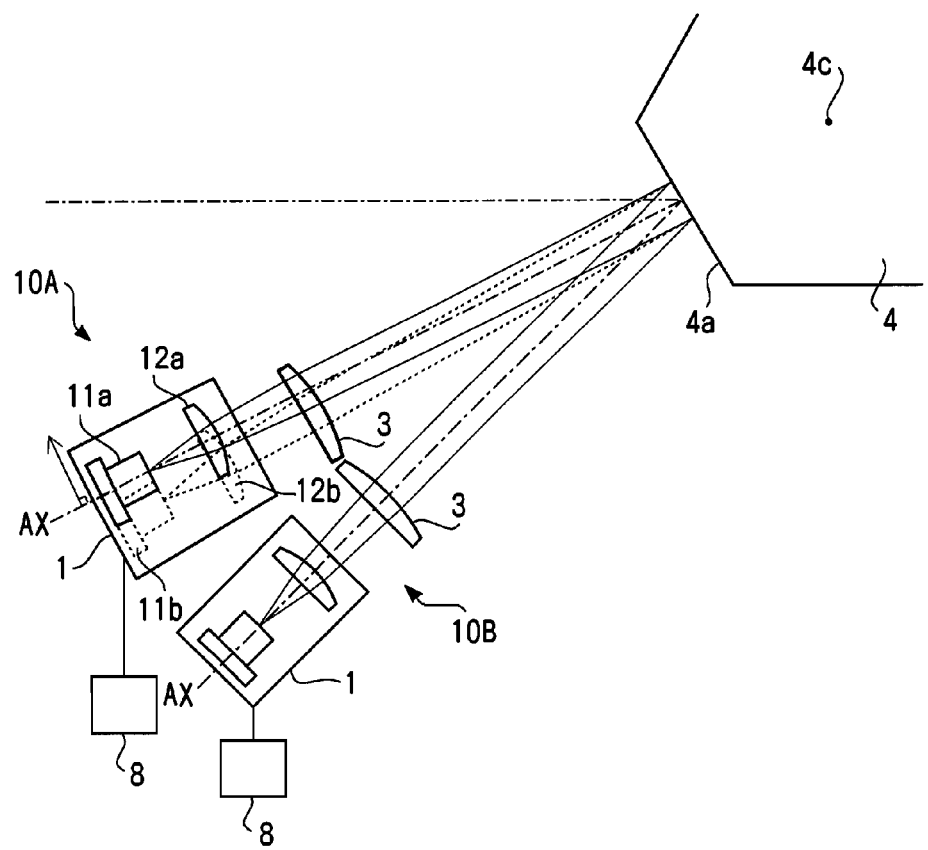
FIG. 3 is an enlarged view of the vicinity of first optical systems, with a light source unit being shifted, according to the first embodiment.

For this reason, the optical path adjusting unit 8 moves to shift (translates) the light source unit 1 in a direction perpendicular to the optical axis AX of the converging lens 3 and on a plane perpendicular to a direction in which the polygonal mirror arranged closest to the surface to be scanned deflects the beam. Specifically, the polygonal mirror arranged closest to the surface to be scanned corresponds to the second polygonal mirror 6. Therefore, the direction in which the polygonal mirror 6 deflects the beam is the main scanning direction, and the plane perpendicular to the direction is the auxiliary scanning plane. FIG. 3 is an enlarged view illustrating a situation where the light source unit 1 is shifted. In FIG. 3, the arrangement of elements and optical paths of the laser beam before they are shifted is indicated with broken lines. Further, the arrangement thereof after the shift is indicated with solid lines. A direction in which the light source unit 1 is shifted is indicated by an arrow. For comprehension purpose, the light source and coupling lens before the shift are assigned with reference numerals 11b and 12b, and those after the shift are assigned with reference numerals 11a and 12a, respectively.

When the light source unit 1 shifts, the optical path of the laser beam which is incident on the converging lens 3 (hereinafter, the optical path is referred to as an incident optical path) translates on the auxiliary scanning plane. Specifically, the incident optical path shifts parallelly in a direction perpendicular to the optical axis of the converging lens 3 on the auxiliary scanning plane. Thus, as shown in FIG. 3, it is understood that the incident optical path between the coupling lens 12a and the converging lens 3 shifts parallelly with respect to the incident optical path between the coupling lens 12b and the converging lens 3.

As shown in FIG. 3, since the deflection surface 4a is located at a position which is spaced from the converging lens 3 by its focal length f, the laser beam emitted by the light source unit 1, which is translated by the optical path adjusting unit 8, is incident on the deflection surface 4a at a position which is substantially the same position at which the laser beam emitted by the light source unit 1 before translated is incident, although the incident angles are changed. Accordingly, it is possible to adjust the position of the beam spot on the screen S while preventing effectively the vignetting by the deflection surface 4a.

Figure 4:
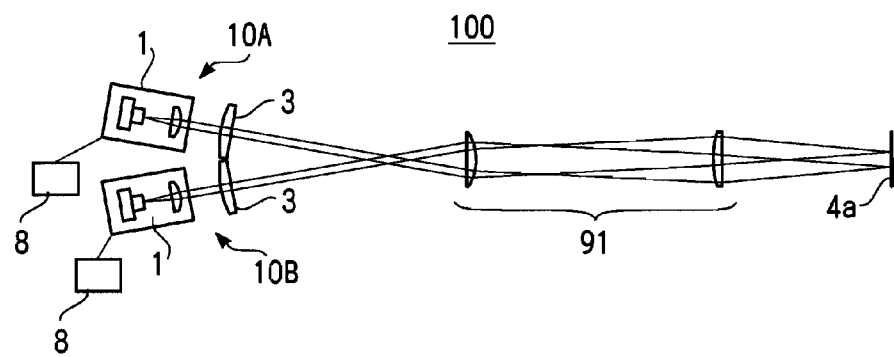
FIG. 4 is an enlarged view of the vicinity of first optical systems of the multibeam scanning device according to a second embodiment.
Figure 5:
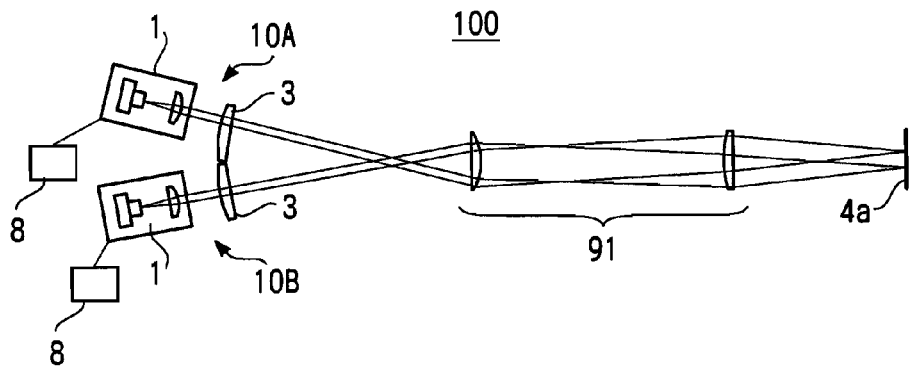
FIG. 5 is an enlarged view of the vicinity of first optical systems, with a light source unit being shifted, according to the second embodiment.

The first optical systems 10A and 10B according to the first embodiment can be modified as described below. In the description below, only configurations and characteristic features unique to each embodiment are described, and, regarding the configurations/elements which are same as those of the first embodiment, the above described explanations are referred to. FIG. 4 shows an enlarged view (the auxiliary scanning plane) of the vicinity of the first optical systems 10A and 10B according to a second embodiment. FIG. 5 illustrates a situation where a light source unit 1 of the first optical system 10A has been shifted in the multibeam scanning device 100 according to the second embodiment. It should be noted that, regarding FIGS. 4 and 5 and in FIGS. 6-16, a plane parallel with the paper surface corresponds to the auxiliary scanning plane.

As shown in FIGS. 4 and 5, the multibeam scanning device 100 according to the second embodiment is provided with an angular magnification alteration optical system 91 of which the angular magnification is −½ between the first optical system 10A and the deflection surface 4a. According to the second embodiment, the angular magnification alteration optical system 91 is a part of the common optical system. Further, the optical systems located on the downstream side of the angular magnification alteration optical system 91 correspond to the second optical system.

According to the second embodiment where the angular magnification alteration optical system 91 is located between the first optical system 10A and the deflection surface 4a of the first polygonal mirror 4, the converging lenses 3 are arranged such that the optical axes thereof intersect with each other at a position spaced from the converging lenses 3 by their focal length f, and the angular magnification alteration optical system 91 is arranged such that the entrance pupil thereof coincides with the intersecting position of the optical axes of the converging lenses 3. In the second embodiment, the entrance pupil position of the angular magnification alteration optical system 91 is not located on the deflection surface 4a. The deflection surface 4a is positioned at an exit pupil of the angular magnification alteration optical system 91.

As described above according to the second embodiment, the components constituting the first optical system 10A are arranged as explained above in regard to the first embodiment. That is, the optical axes of the converging lenses 3 intersect with each other at the position deviated by the focal length thereof. Therefore, as shown in FIG. 5, by translating the first optical system 10A, a position at which the chief rays of the laser beams intersect with each other remains unchanged, while the angle formed between the chief rays of the laser beams is varied. Since the intersecting position coincides with the position of the entrance pupil of the angular magnification alteration optical system 91, the incident angles of the laser beams incident on the deflection surface 4a of the first polygonal mirror 4 are changed, but the laser beams are incident on the deflection surface 4a at substantially the same position as the position at which the laser beam emitted from the light source 1 before the shift are incident on the deflection surface 4a.

It should be noted that in the configuration where the angular magnification alteration optical system 91 is located between the deflection surface 4a and the first optical systems 10A and 10B, a part of the power of the angular magnification alteration optical system may be burdened by the converging lens 3.

Figure 6:
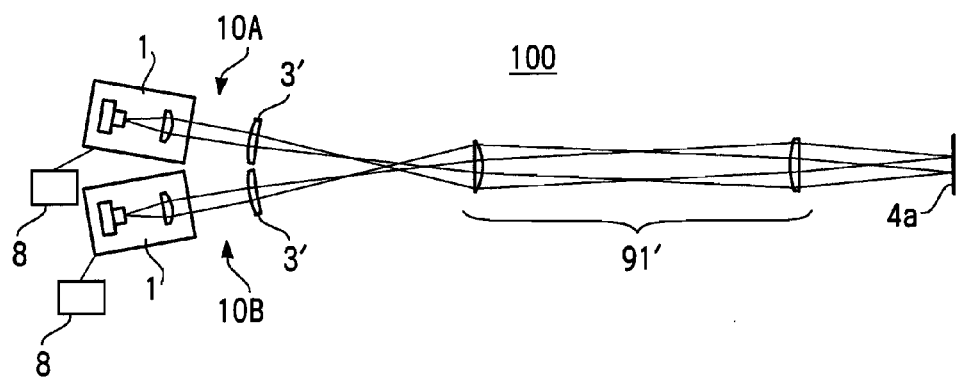
FIG. 6 is an enlarged view of the vicinity of first optical systems of the multibeam scanning device according to a third embodiment.
Figure 7:
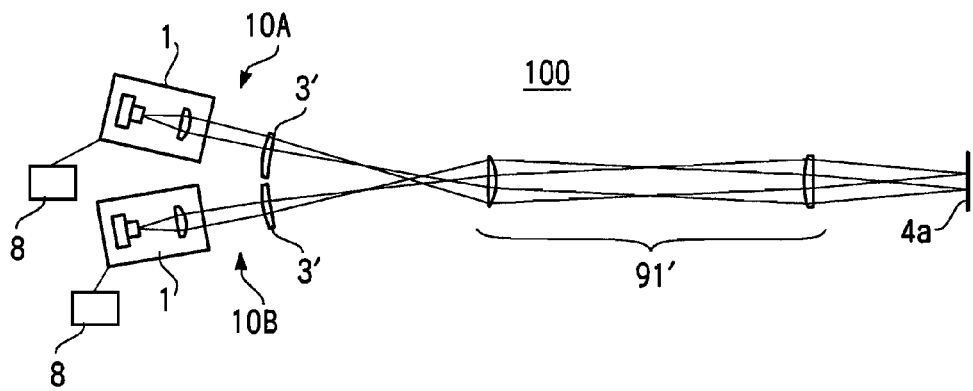
FIG. 7 is an enlarged view of the vicinity of first optical systems, with a light source unit being shifted, according to the third embodiment.

FIG. 6 is an enlarged view of the vicinity of the first optical systems 10A and 10B of the multibeam scanning device 100 according to a third embodiment. FIG. 7 illustrates a state where a light source unit 1 of the first optical system 10A has been shifted in the multibeam scanning device 100 according to the third embodiment.

The multibeam scanning device 100 according to the third embodiment is configured based on the second embodiment such that part of the power of the angular magnification alteration optical system of the second embodiment is burdened by the converging lenses 3. Specifically, as shown in FIGS. 6 and 7, a converging lens 3' converts the laser beam incident from the light source unit 1, which beam is a non-collimated light beam, into a converging beam (that forms a real image once between the converging lens and the angular magnification alteration optical system). That is, the converging lens 3' is configured to bear a part of the power of the angular magnification alteration optical system 91'. Regarding the other configuration, the same configuration as that of the second embodiment is employed.

As shown in FIGS. 6 and 7, similar to the second embodiment, by arranging the components constituting the first optical systems 10A and 10B as described above, the same advantages as those of the above described other embodiments can be achieved.

Figure 8:
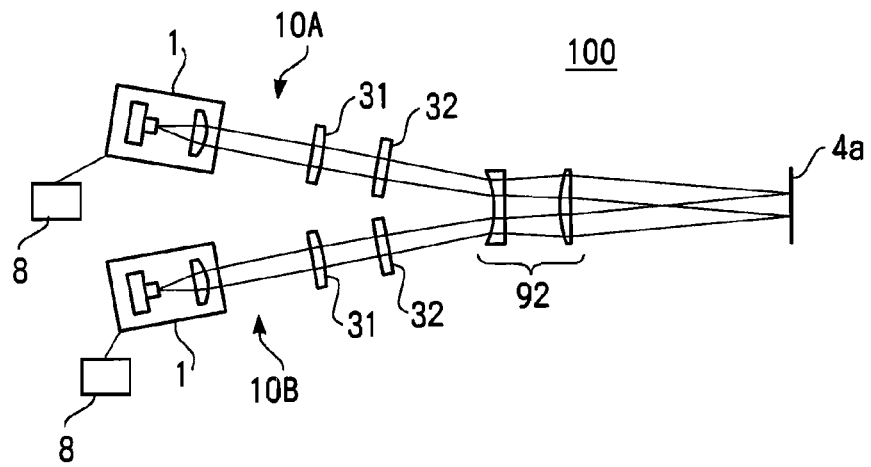
FIG. 8 is an enlarged view of the vicinity of first optical systems of the multibeam scanning device according to a fourth embodiment.
Figure 9:
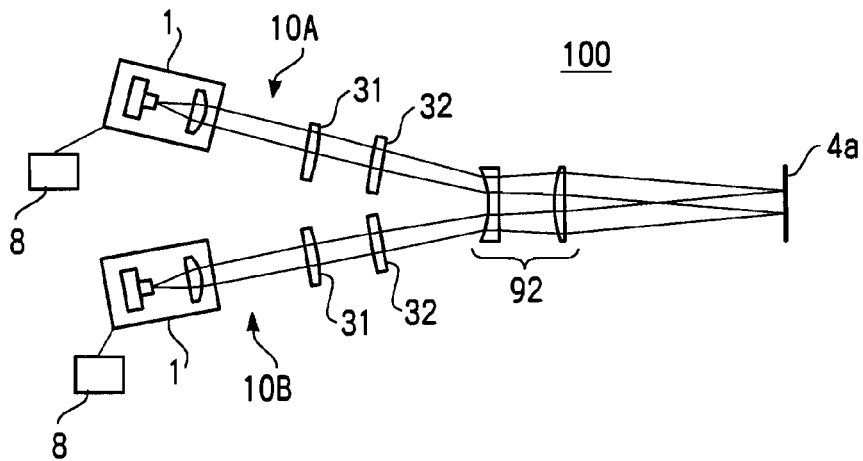
FIG. 9 is an enlarged view of the vicinity of first optical systems, with a light source unit being shifted, according to the fourth embodiment.

FIG. 8 is an enlarged view of the vicinity of the first optical systems 10A and 10B of the multibeam scanning device 100 according to a fourth embodiment. FIG. 9 illustrates a state where a light source unit 1 of the first optical system 10A has been shifted in the multibeam scanning device 100 according to the fourth embodiment.

According to the fourth embodiment, an angular magnification alteration optical system 92 is inserted between the first optical system 10A and the deflection surface 4a in order to enlarge an arrangement interval (angular distance) between the light sources 1. In the fourth embodiment, the angular magnification of the angular magnification alteration optical system 92 is +½ which is different from the second and third embodiments. Further, since the laser beam passed through the angular magnification alteration optical system 92 has a predetermined angular magnification, the converging lens is formed of two lens elements 31 and 32. Specifically, as in the case of the converging lens 3 according to the first embodiment, the converging lens 31 has a power for converting the laser beam, which is a non-collimated light beam, incident from the light source unit 1 into a collimated light beam. The converging lens 32 has a positive power for converting the collimated light beam incident from the converging lens 31 into a converging light beam having a predetermined converging characteristic. In other words, the converging lens 32 is a lens that bears part of the power of the angular magnification alteration optical system 92.

As shown in FIGS. 8 and 9, according to the fourth embodiment, the angular magnification alteration optical system 92 having the different magnification is provided, and the converging lenses 31 and 32 corresponding to the magnification of the angular magnification alteration optical system 92 are provided. By arranging the first optical systems 10A and 10B as described above, the same advantages as those of the above described embodiments can be achieved.

Figure 10:
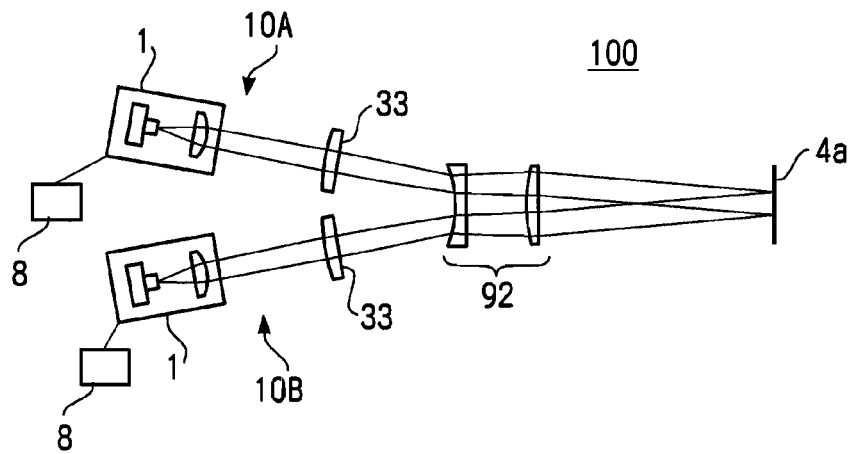
FIG. 10 is an enlarged view of the vicinity of first optical systems of the multibeam scanning device according to a fifth embodiment.
Figure 11:
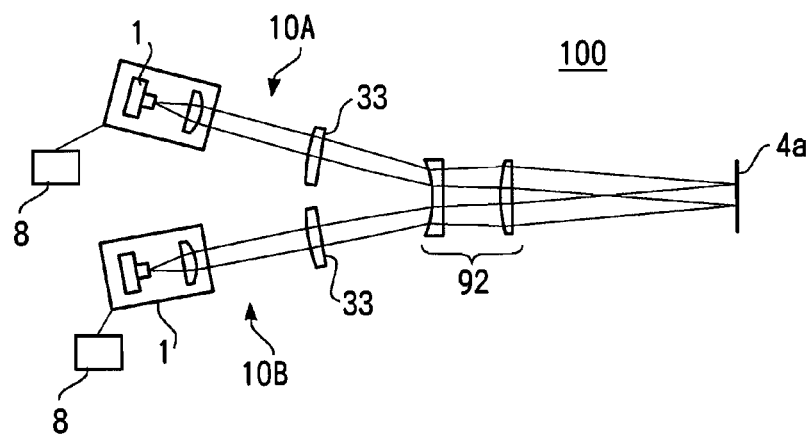
FIG. 11 is an enlarged view of the vicinity of first optical systems, with a light source unit being shifted, according to the fifth embodiment.

FIG. 10 is an enlarged view of the vicinity of the first optical systems 10A and 10B of the multibeam scanning device 100 according to a fifth embodiment. FIG. 11 illustrates a state where a light source unit 1 of the first optical system 10A has been shifted in the multibeam scanning device 100 according to the fifth embodiment.

According to the fifth embodiment, the converging lens elements 31 and 32 of the fourth embodiment are replaced with a single lens element 33. The other configuration is the same as that of the fourth embodiment.

Numerical examples corresponding to the first through fifth embodiments described above will be shown in Tables 1 through 5, respectively.

TABLE 1

EXAMPLE 1

| | |
|---|---|
| Specification of Angular Magnification Alteration Optical System | NONE (downstream on deflection surface) |
| Light Source Shiftable Amount | −2.382 (mm) |
| Changeable Amount of Incident Angle on Deflection Surface | 5.000 (°) |
| Displace Amount on Screen (focal length of scanning lens: 1000 mm) | 87.3 (mm) |
| Pupil Position | 30 mm from principal point of Converging Lens 3 (on Deflection Surface (=entrance pupil position of lens system 5)) |
| Focal Length f of Converging Lens | 30.000 (mm) |
| Focal Length L of Coupling Lens | 10.426 (mm) |
| Reciprocal of Magnification M of Coupling Lens | 0.333 |

TABLE 2

EXAMPLE 2

| | |
|---|---|
| Specification of Angular Magnification Alteration Optical System | Angular Magnification − ½, Fno Magnification 2 |
| Light Source Shiftable Amount | 3.000 (mm) |
| Changeable Amount of Incident Angle on Deflection Surface | 2.000 (°) |
| Displace Amount on Screen (focal length of scanning lens: 1000 mm) | 34.9 (mm) |
| Pupil Position | 40 mm from principal point of Converging Lens 3 (in front of 1st surface of Angular Magnification Alteration system 91 by 38.6 mm) |
| Focal Length f of Converging Lens | 40.000 (mm) |
| Focal Length L of Coupling Lens | 10.000 (mm) |
| Reciprocal of Magnification M of Coupling Lens | 0.192 |

TABLE 3

EXAMPLE 3

| | |
|---|---|
| Specification of Angular Magnification Alteration Optical System | Angular Magnification − ½, Fno Magnification 1 |
| Light Source Shiftable Amount | 3.000 (mm) |
| Changeable Amount of Incident Angle on Deflection Surface | 2.000 (°) |
| Displace Amount on Screen (focal length of scanning lens: 1000 mm) | 34.9 (mm) |
| Pupil Position | 40 mm from principal point of Converging Lens 3' (in front of 1st surface of Angular Magnification Alteration system 91' by 38.6 mm) |
| Focal Length f of Converging Lens | 40.000 (mm) |
| Focal Length L of Coupling Lens | 10.000 (mm) |
| Reciprocal of Magnification M of Coupling Lens | −0.210 |

TABLE 4

EXAMPLE 4

| | |
|---|---|
| Specification of Angular Magnification Alteration Optical System | Angular Magnification + ½, Fno Magnification 1 |
| Light Source Shiftable Amount | 1.770 (mm) |
| Changeable Amount of Incident Angle on Deflection Surface | 1.000 (°) |
| Displace Amount on Screen (focal length of scanning lens: 1000 mm) | 17.5 (mm) |
| Pupil Position | 74.3 mm from principal point of Converging Lens 31 (in the rear of 1st surface of Converging Lens by 64.3 mm) |
| Focal Length f of Converging Lens | 74.300 (mm) |
| Distance between Converging Lenses 31 and 32 | 10.000 (mm) |
| Focal Length L of Coupling Lens | 10.000 (mm) |
| Reciprocal of Magnification M of Coupling Lens | 0.158 |

TABLE 5

EXAMPLE 5

| | |
|---|---|
| Specification of Angular Magnification Alteration Optical System | Angular Magnification + ½, Fno Magnification 1 |
| Light Source Shiftable Amount | 1.500 (mm) |
| Changeable Amount of Incident Angle on Deflection Surface | 1.000 (°) |
| Displace Amount on Screen (focal length of scanning lens: 1000 mm) | 17.5 (mm) |
| Pupil Position | 40 mm from principal point of Converging Lens 33 (in the rear of 1st surface of Angular Magnification Alteration system 92 by 18.3 mm) |
| Focal Length f of Converging Lens | 40.000 (mm) |
| Focal Length L of Coupling Lens | 10.000 (mm) |
| Reciprocal of Magnification M of Coupling Lens | 0.155 |

The embodiments of the present invention have been described above. It should be noted that the invention need not be limited to above-described exemplary embodiments, and can be modified in various ways while maintaining the above described advantages.

For example, in the above-described embodiments, the light source unit 1 is mechanically translated to adjust the optical path of the laser beam and thereby to change the incident angle of the laser beam with respect to the deflection surface 4a. The invention need not be limited to such a configuration and, for example, the optical path of the laser beam emitted by the light source unit 1 itself may be changed. Specifically, an optical path adjusting optical element, which translates the optical path of the laser beam emitted from the light source 1, may be inserted between the light source unit 1 and the converging lens 3. With this configuration, by displacing the optical path adjusting optical element, the optical path is adjusted. Since the above described feature can not be attained when the divergence of the laser beam is changed, the optical path adjusting optical element does not have a power. An example of such an optical element is a polo prism, which has a plurality of reflection surfaces. When such an optical element is employed, by changing the positions of the plurality of reflection surfaces, the incident optical path can be translated and thereby the incident angle on the deflection surface can be changed.

Figure 12:
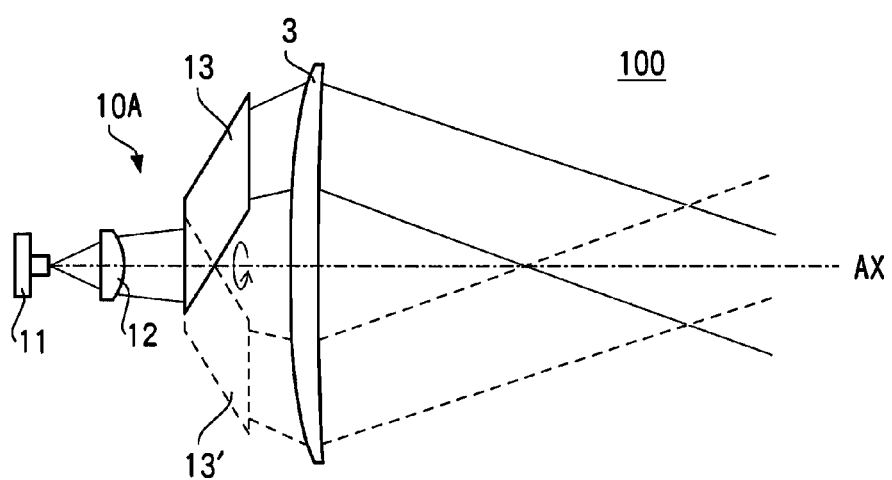
FIG. 12 illustrates a variation of the multibeam scanning device according to the invention.
Figure 13:
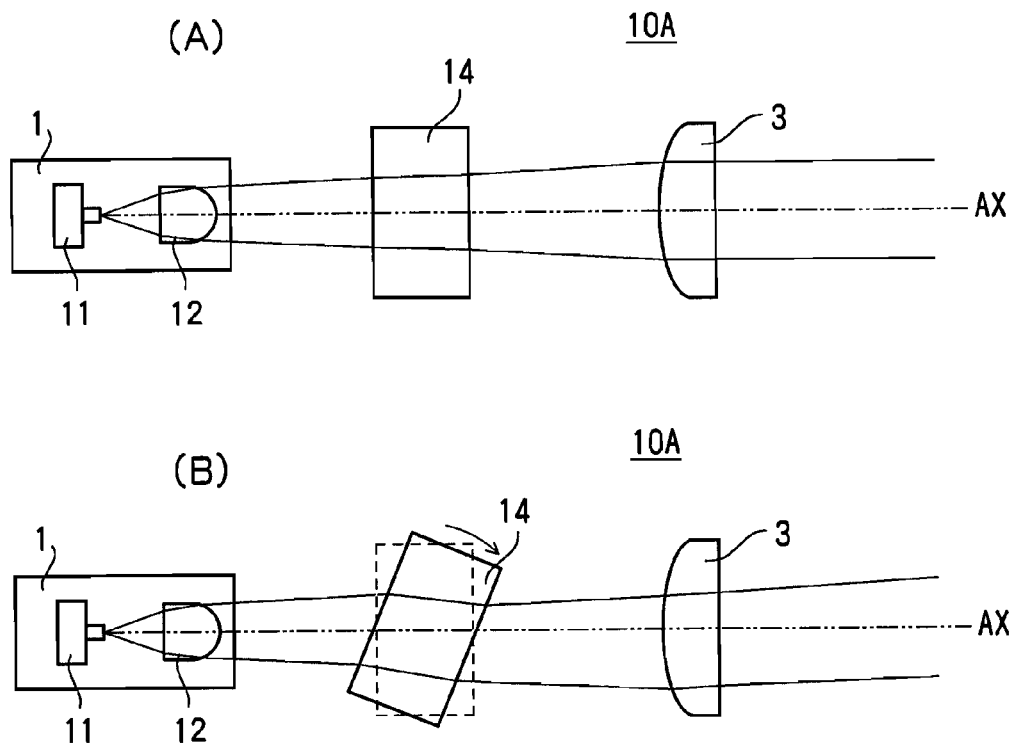
FIG. 13 illustrates a variation of the multibeam scanning device according to the invention.

FIG. 12 shows a variation of the multibeam scanning device which employs the optical path adjusting optical element. In the variation shown in FIG. 12, a prism having two reflection surfaces which are parallel to each other, i.e., a parallelogram prism 13, is arranged between the coupling lens 12 and the converging lens 3. The parallelogram prism 13 is rotated about a central axis of the laser beam (referred to as an emitting optical axis of the light source 1) emitted from the light source 1. In the variation shown in FIG. 12, the emitting optical axis of the light source unit 1 coincides with the optical axis AX of the converging lens 3. With this configuration, the optical path (i.e., the incident optical path) of the laser beam incident on the converging lens 3 can be translated in a direction perpendicular to the optical axis of the converging lens 3, and the incident angle of the laser beam with respect to the deflection surface 4a can be changed. In FIG. 12, a position of the parallelogram prism 13' after rotated is indicated by broken line. In this variation, the incident optical path is defined as an optical path between the parallelogram prism 13 (or 13') and the converging lens 3.

When the parallelogram prism 13 is rotated, the position of the beam spot may also be changed slightly in the main scanning direction. However, the position of the beam spot in the main scanning direction can easily be corrected by adjusting a modulation timing of the laser beam and thus the change in the main scanning direction does not cause a problem.

As the optical path adjusting optical element, another element such as a parallel plate may be used. FIGS. 13A and 13B show another variation of a multibeam scanning device where a parallel plate 14 is employed as an optical path adjusting optical element. Specifically, FIG. 13(A) shows an auxiliary scanning cross section of the vicinity of the first optical system 10A before the position adjustment by the parallel plate 14 is conducted. FIG. 13(B) is an auxiliary scanning cross section illustrating the vicinity of the first optical system 10A after the position adjustment by the parallel plate 14 is conducted. As shown in FIGS. 13(A) and 13(B), according to the variation, by rotating the parallel plate 14 about an axis which is perpendicular to the auxiliary scanning plane (i.e., about an axis extending in the main scanning direction), the optical path of the laser beam emitted by the light source unit 1 can be adjusted.

Figure 14:
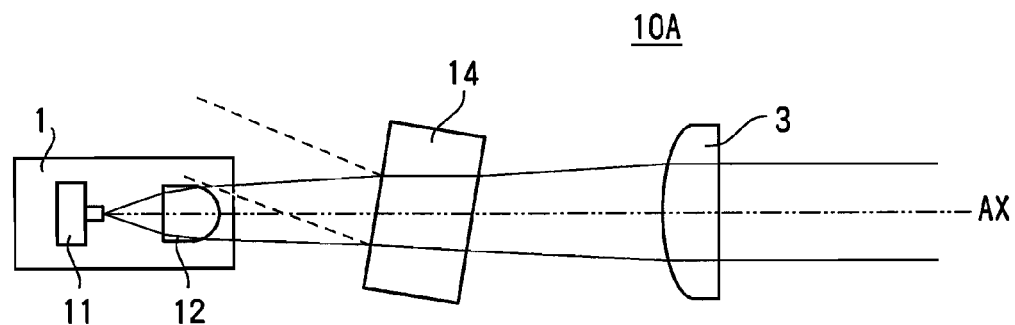
FIG. 14 illustrates a variation of the multibeam scanning device according to the invention.

FIG. 14 is a cross section of the main scanning plane of the vicinity of the first optical system 10A according to the variation shown in FIGS. 13(A) and 13(B). When the optical path adjusting optical element (e.g., the parallel plate 14 in this variation) is employed, care should be made to the following point. If a surface of the optical path adjusting optical element facing the light source (i.e., a light receiving surface) is arranged to be substantially perpendicular to the emitting optical axis of the light source unit 1 (the optical axis AX of the converging lens 3 in this case), part of the incident beam may return to the light source unit 1 due to retroreflection. Such returning light is known to cause deterioration of the light source unit 1 and should be prevented. For this purpose, as illustrated in FIG. 14, the parallel plate 14 which is the optical path adjusting optical element is arranged such that the light receiving surface is normally inclined with respect to the emitting optical axis of the light source unit 1. In this case, the "normally" means that regardless of the rotation of the optical path adjusting optical element, the light receiving surface never become perpendicular to the emitting optical axis. By such an arrangement and configuration, the light reflected from the light receiving surface can be prevented from returning to the light source unit 1, and the deterioration of the performance can be prevented.

In the above-described embodiments and variations, the incident angle of the laser beam with respect to the deflection surface 4a is adjusted without changing the incident position of the laser beam on the deflection surface 4a. However, actually, it is necessary to adjust the incident position of the laser beam to make the laser beams incident on the deflection surface 4a at a predetermined position as a preliminary stage before adjustment of the incident angle. For adjusting the incident position of the laser beam, in general, the coupling lens may be shifted with respect to the optical axis of the light source or light source unit itself is inclined so that the emergence angle of the laser beam emerging from the light source unit can be adjusted. It is known that the adjustment according to the former method (i.e., shifting of the coupling lens) is difficult since the shift of the incident position of the laser beam is relatively large with respect to the shift amount of the coupling lens. Therefore, frequently, the latter method (i.e., inclining the light source unit) is generally employed in comparison with the former method. However, if the latter method is employed in the multibeam scanning device according to the present invention, the following problem arises.

If the latter method is employed in the multibeam scanning device according to the invention, since the light source unit 1 is configured to emit the converging light beam or the diverging light beam, a focusing point of the laser beam is changed as a position of the light source unit 1 along the optical axis thereof is shifted, with respect to an appropriate position of the deflection surface 4a, due to the inclination thereof. To prevent occurrence of shift of the focusing point, it is necessary to employ a complicated mechanism which is capable of keeping the distance between the light source unit 1 and the focusing point even if the light source unit 1 is inclined. Such a complicated mechanism is not preferable since the manufacturing cost of the multibeam scanning device is increased. In this viewpoint, the assignor achieves a configuration capable of adjusting finely the incident position of the laser beam without increasing the cost of the multibeam scanning device 100 by employing the multibema scanning device 100 according to another variation which is described below.

Figure 15:
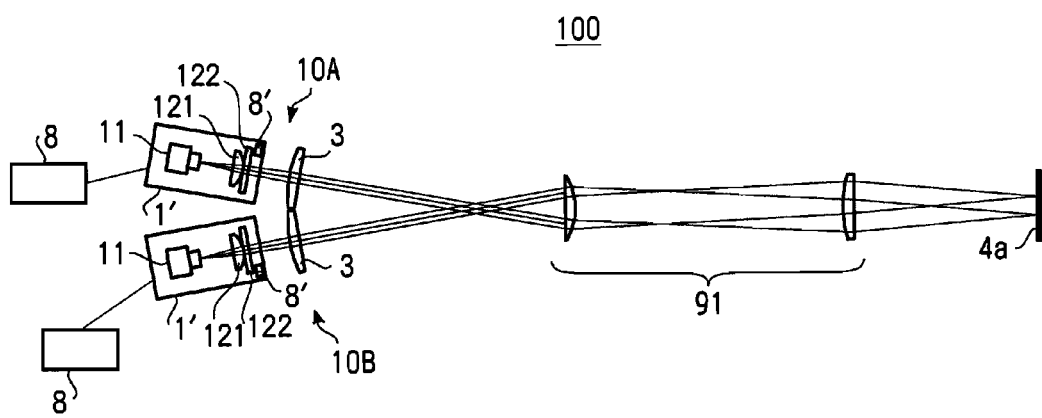
FIG. 15 illustrates a variation of the multibeam scanning device according to the invention.

FIG. 15 is an enlarged view of the vicinity of the first optical systems 10A and 10B of the multibeam scanning device 100 according to another variation. FIGS. 16(A) and 16(B) respectively show the light source unit 1 of the multibeam scanning device 100 according to the variation.

As shown in FIG. 15, the multibeam scanning device 100 according to the variation is configured by replacing the light source unit 1 of the second embodiment with the light source unit 1'.

The light source unit 1' includes a light source 11, a first coupling lens 121, a second coupling lens 122 and an angle adjusting unit 8'. As described above, in the variation, the coupling lens which is essentially formed of a single lens in the light source unit is configured as a plurality of lenses (two lenses in this case). The power of the second coupling lens 122 is smaller than that of the first coupling lens 121. More specifically, when P1 represents a power of the first coupling lens 121 and P2 represents a power of the second coupling lens 122, each coupling lens is formed to satisfy the following relationship:

$$P1 > 10 \cdot |P2|.$$

Figure 16:
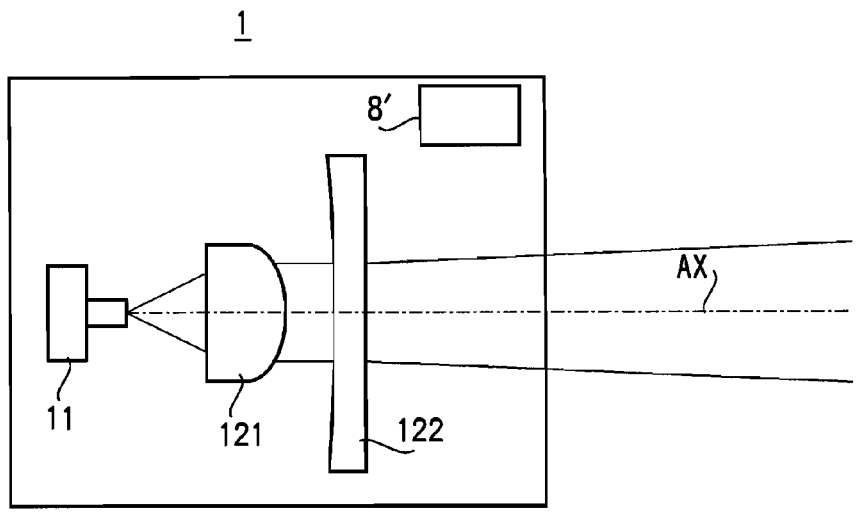
FIG. 16 illustrates a variation of the multibeam scanning device according to the invention.
Figure 16:
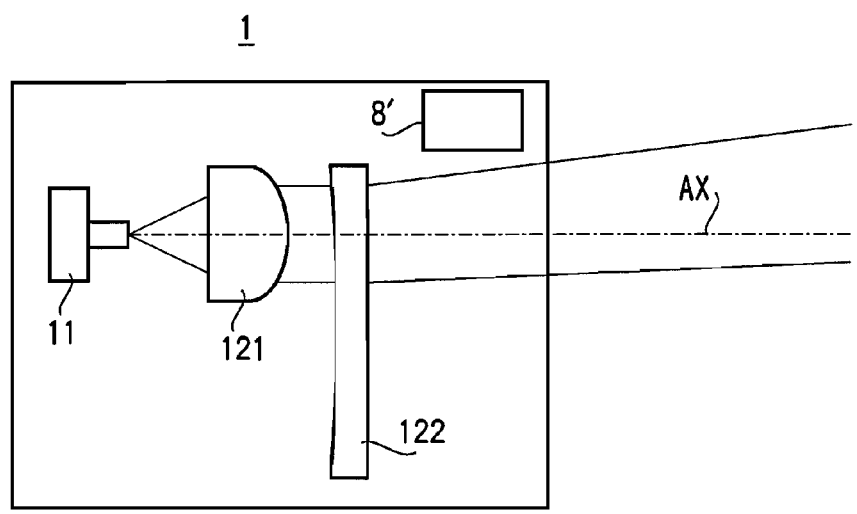

The angle adjusting unit 8' is configured to shift the second coupling lens 122, within the auxiliary scanning plane, in a direction perpendicular to the optical axis of the light source unit 1'. FIG. 16 (A) illustrates a situation before the second coupling lens 122 is translated. FIG. 16 (B) illustrates a situation after the second coupling lens 122 is translated. As shown in FIGS. 16(A) and 16(B), the emergence angle of the laser light emitted from the light source unit 1' changes by translating the second coupling lens 122 with respect o the first coupling lens 121. By adjusting the above described emergence angle by translating the second coupling lens 122, the incident position of the laser light on the deflection surface 4a can be adjusted.

According to the variation, the distance between the light source unit 1' and the deflection surface 4a is kept constant since the light source unit 1' is not inclined (only the second coupling lens 122 is shifted in the direction perpendicular to the optical axis of the light source unit 1', without changing the position of the light source 11). Therefore, the focusing position of the laser beam is not shifted even if the incident position is adjusted. Further, since the second coupling lens 122, which has a relatively small power, is shifted, change of an emergence angle with respect to the shifting amount of the second coupling lens 122 is relatively small. Therefore, the incident position of the laser beam on the deflection surface 4a can be adjusted accurately.

In order to ensure that the laser beam passed through the first coupling lens 121 is incident on the second coupling lens 122 even if it is shifted, a diameter of the second coupling lens 122 is larger than that of the first coupling lens 121. According to the exemplary embodiment, the diameters of the first coupling lens 121 and the second coupling lens 122 are 6 mm and 8 mm, respectively. Schematic specification of the first coupling lens 121 and the second coupling lens 122 are as follows. The focal length and magnification of the first coupling lens 121 are 10 mm and 0.088, while those of the second coupling lens 122 are −100 mm and −2.192. As a whole, the coupling lens (i.e., the combination of the first and second coupling lenses 121 and 122) has a power of −0.192. Accordingly, the coupling lens, as a whole, emerges the laser beam having a diverging characteristic. It should be noted that the invention need not be limited to this configuration. The first and second coupling lenses 121 and 122 may be configured such that the converging laser beam is emerged therefrom.

It should be noted that the configuration of the light source unit enabling the adjustment of the incident position on the deflection surface 4a can be employed in any one of the above-described embodiments and variations.

In the foregoing embodiments and variations, the multibeam scanning device 100 is preferably employed in a projector. It should be appreciated that the multibeam scanning device may also be employed an any other suitable imaging device such as printers, image scanners and the like.

In the above-described embodiments and variations, a plurality of first optical systems are arranged on the auxiliary scanning plane so that a plurality of beam spots, which are spaced from each other in the auxiliary scanning direction, are formed on the screen S. The invention need not be limited to such a configuration, and a plurality of first optical systems may be arranged on a plane perpendicular to the auxiliary scanning plane (i.e., on a main scanning plane). In such a case, the plurality of laser beams scan the same line on the screen S. Thus, in such a modification, the incident optical path is translated on the main scanning plane. Such a modification is particularly convenient when relatively large light amount is required for each scan.

In each of the above-described embodiments and variations, the coupling lenses provided to the light source units have the same magnification. However, the invention need not be limited to such a configuration, and the magnification of the coupling lenses may be differentiated so as to meet the optical characteristics such as curvature of field and the like of the optical systems employed in the multibeam scanning system.

The entrance pupil position and the exit pupil position of a partial optical system (e.g., a relaying lens system 5 or an angular magnification alteration optical system) in a common optical system may not strictly coincide with a deflection surface of a deflector. When the entrance pupil position and the exit pupil position coincide substantially with the deflection surface, the optical performance of the multibeam scanning device is not affected.

In the above described embodiments and variations, a single light source (a laser light source) is formed to have a single opening (i.e., one beam per a single chip light source). However, in another embodiment, a single light source (a laser light source) may have a plurality of openings (i.e., multiple beams per a single chip light source).

As described above, according to the multibeam scanning device of the present invention, even if the multibeam scanning device is not able to converge the light onto the defection surface of the deflector in the auxiliary scanning plane, it is possible to adjust the position of the spot formed on the screen, by simply translating the incident optical path defined when the laser light emitted by each light source enters an optical element, furthermore, according to the embodiment, by appropriately arranging components and by letting all the beams enter the same position on the deflection surface, it is not necessary to increase the size of the deflector for preventing occurrence of vignetting. That is, it is possible to provide a multibeam scanning device capable of stably adjusting the position of the spot formed on a scanned surface.

What is claimed is:

1. A multibeam scanning device, comprising:
    a plurality of first optical systems,
        each of the plurality of optical systems including:
            a light source unit configured to emit a non-collimated light beam; and
            an optical element having a predetermined power and having an optical effect on the laser beam;
    a second optical system arranged on a downstream side of the plurality of first optical systems, including:
        a first deflector on which light beams emitted by the plurality of first optical systems are incident, the first deflector being to deflect the laser beams; and
        a common optical system configured to change degree of divergence of each of the plurality of light beams; and
    an optical path shifting system configured to translate an incident optical path of the light beam which is emitted by the light source unit and incident on the optical element in a direction perpendicular to an optical axis of the optical element in a plane perpendicular to a direction in which a deflector closest to a surface to be scanned deflects the light beam, wherein all the light beams incident on the first deflector are incident on the first deflector at substantially the same position, and wherein the optical elements are arranged such that optical axes of the optical elements intersect at a position spaced from the optical element by a distance equal to a focal length of the optical element.

2. The multibeam scanning device according to claim 1, wherein the light source unit includes a light emitting unit configured to emit the light beam, and a coupling lens group configured to reduce the degree of divergence of the light beam emitted by the light emitting unit, and wherein a magnification M of the coupling lens group meets a condition: $|1/M|>0.0006$.

3. The multibeam scanning device according to claim 1, wherein the optical element is a collimating lens that converts the light beam emitted by the light source unit to a collimated light beam.

4. The multibeam scanning device according to claim 1, wherein at least a part of the common optical system is arranged on an upstream side of the first deflector, and wherein an exit pupil of the at least a part of the common optical system is positioned at a deflection surface of the first deflector.

5. The multibeam scanning device according to claim 4, wherein the at least a part of the common optical system is an angular magnification alteration optical system.

6. The multibeam scanning device according to claim 4, wherein the optical element is provided with a part of the magnifying power of the common optical system.

7. The multibeam scanning device according to claim 1, wherein all the common optical system are arranged on the downstream side of the first deflector, and wherein the entrance pupil of the common optical system coincides with the deflection surface of the first deflector.

8. The multibeam scanning device according to claim 1, wherein the optical path shifting system shifts the light source unit in the predetermined direction to translate the incident optical path.

9. The multibeam scanning device according to claim 1, wherein the optical path shifting system includes an optical path adjusting optical element having no power provided between the light source unit and the optical element, and wherein the optical path shifting system translates the incident optical path by displacing the optical path adjusting optical element.

10. The multibeam scanning device according to claim 9, wherein the optical path adjusting optical element has a plurality of reflection surfaces, and wherein the incident optical path is translated by changing a relative position of each reflection surface.

11. The multibeam scanning device according to claim 9, wherein the optical path adjusting optical element is a prism having two reflection surfaces parallel to each other, and wherein positions of the reflection surfaces are changed by rotating the prism about a rotation axis which is an emitting optical axis of the light source unit.

12. The multibeam scanning device according to claim 9, wherein the optical path adjusting optical element is a parallel plate, and wherein the incident optical path is translated by rotating the parallel plate about an axis which is perpendicular to an emitting optical axis of the light source unit.

13. The multibeam scanning device according to claim 11, wherein a light receiving surface of the optical path adjusting optical element, on which the light beam emitted by the light source unit is incident is inclined normally with respect to the emitting optical axis of the light source unit.

14. The multibeam scanning device according to claim 1, wherein the common optical system further includes a scanning optical system which enables the light beams directed from the first deflector to scan on the surface to be scanned at a constant speed.

15. The multibeam scanning device according to claim 14, wherein the second optical system includes:

a second deflector which is arranged between the first deflector and the scanning optical system and deflects the light beams incident on the second deflector in a direction perpendicular to a direction in which the first deflector deflects the light beams; and a relaying optical system arranged between the first deflector and the second deflector, and wherein the surface to be scanned is unmovable with respect to the scanning optical system.

16. The multibeam scanning device according to claim 1, further comprising a chief ray emission angle adjusting system configured to adjust an emission angle at which the light beam is emitted from the light source unit in the plane perpendicular to a direction in which the deflector closest to the surface to be scanned deflects the light beam.

17. The multibeam scanning device according to claim 16, wherein the chief ray emission angle adjusting system includes:

a coupling lens group provided in the light source unit; and a coupling lens shifting system configured to shift each coupling lens of the coupling lens group in a direction perpendicular to the optical axis of the light source unit in the plane perpendicular to a direction in which the deflector closest to the surface to be scanned deflects the light beam.

18. The multibeam scanning device according to claim 17, wherein the coupling lens group includes a first coupling lens and a second coupling lens having a smaller power than the first coupling lens; and wherein the coupling lens shifting system is configured to shift the second coupling lens, relative to the first coupling lens, in a direction perpendicular to the optical axis of the light source unit in the plane perpendicular to a direction in which the deflector closest to the surface to be scanned deflects the light beam.

19. The multibeam scanning device according to claim 18, wherein when P1 represents a power of the first coupling lens and P2 represents a power of the second coupling lens, the multibeam scanning device meets a relationship: $P1>10|2|$.

20. The multibeam scanning device according to claim 18, wherein a diameter of the second coupling lens is larger than a diameter of the first coupling lens.

21. The multibeam scanning device according to claim 12, wherein a light receiving surface of the optical path adjusting optical element, on which the light beam emitted by the light source unit is incident is inclined normally with respect to the emitting optical axis of the light source unit.

* * * * *